(No Model.)
H. VON BOSSE.
PLOW.
No. 509,509.   Patented Nov. 28, 1893.
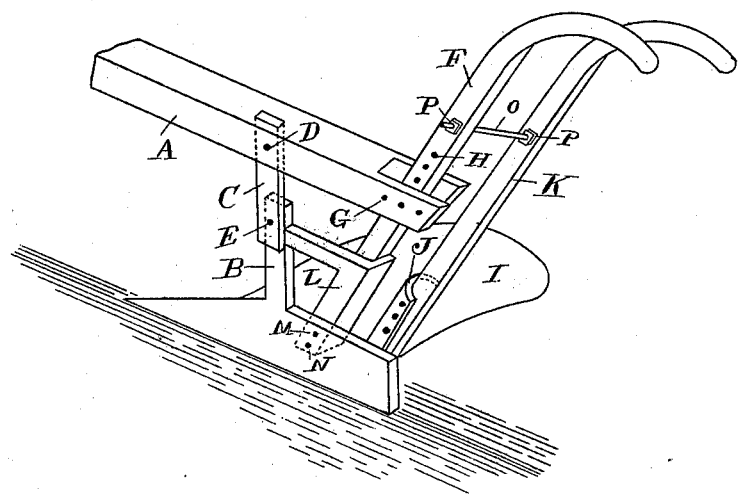
Witnesses
Geo. T. Kincaid
Genie L. Williams
Inventor
H. V. Bosse
by John Wedderburn
his Attorney

UNITED STATES PATENT OFFICE.

HENNING VON BOSSE, OF LOWER PENASCO, TERRITORY OF NEW MEXICO.

PLOW.

SPECIFICATION forming part of Letters Patent No. 509,509, dated November 28, 1893.

Application filed September 16, 1892. Serial No. 446,072. (No model.)

*To all whom it may concern:*

Be it known that I, HENNING VON BOSSE, of Lower Penasco, in the county of Lincoln and Territory of New Mexico, have invented certain new and useful Improvements in Plows; and I do hereby declare the following to be a full, clear, and exact description of the invention, such as will enable others skilled in the art to which it appertains to make and use the same.

My invention relates to improvements in plows, and its object is to supply means whereby the handles may be easily and quickly raised or lowered or spread farther apart, and my invention consists more particularly in the novel arrangement, construction and combination of parts hereinafter specified and set forth in the claim.

In the accompanying drawing I have represented my improved plow in perspective.

The beam A of the plow is secured to an upright projection B on the plow-share, by means of the plate C, which is secured to the beam A and projectiom B, by means of the pins or bolts D and E respectively.

The rear end of the beam A is slotted to receive the plow handle F and also contains a series of holes G, which are adapted to receive a bolt which passes through a corresponding hole H, in the handle F.

On the inner surface of the mold-board I, is bolted a curved plate J, by means of which the handle K of the plow is secured. The plate J and handle K, contains a series of holes through which bolts pass, and by means of which the handle may be raised or lowered as desired. The handle F is also adjustable in the plate L, which contains a series of holes and is secured to the plow-share by means of the two bolts M, N. The handles are spread the required distance apart by means of the threaded rod O, which passes through both handles and is held in place by nuts P, one on each side of each handle.

By means of the series of holes in the beam A, and the handle F, the forward end of the beam may be raised or lowered, by adjusting the position of the inner end of the plow beam on the handle F.

It will be seen that by the arrangement and construction of parts described above, the handles may be raised or lowered and spread farther apart or drawn together to suit the operator and also the beam may be adjusted to tilt at any required angle with direction of the plow-share.

Having thus fully described my invention, what I claim, and desire to secure by Letters Patent, is—

The combination with a plow, having an upward projection, B of the beam slotted at its rear end, the plate C connecting said projection and beam, the curved plate J bolted to the mold board, the plate L bolted to the plow share, and having horizontal arm secured to the upright on the plow, and the handles secured adjustably one to the curved plate and the other in plate L and the slotted rear end of the beam, substantially as shown and described.

In testimony whereof I have signed this specification in the presence of two subscribing witnesses.

HENNING VON BOSSE.

Witnesses:
   J. B. MATHEW,
   R. A. BUFORD.